US012565190B2

(12) United States Patent
Yamada

(10) Patent No.: US 12,565,190 B2
(45) Date of Patent: Mar. 3, 2026

(54) CONTROL DEVICE FOR VEHICLE FOR ELECTRIC TRAVEL SECTION MANAGEMENT

(71) Applicant: TOYOTA JIDOSHA KABUSHIKI KAISHA, Toyota (JP)

(72) Inventor: Yuki Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 18/386,290

(22) Filed: Nov. 2, 2023

(65) Prior Publication Data

US 2024/0239330 A1 Jul. 18, 2024

(30) Foreign Application Priority Data

Jan. 13, 2023 (JP) ................................. 2023-003893

(51) Int. Cl.
B60W 20/40 (2016.01)
B60W 20/12 (2016.01)
(Continued)

(52) U.S. Cl.
CPC ............ B60W 20/40 (2013.01); B60W 20/12 (2016.01); B60W 50/14 (2013.01);
(Continued)

(58) Field of Classification Search
CPC ...... B60W 20/40; B60W 20/12; B60W 20/00; B60K 6/00; B60K 35/00
(Continued)

(56) References Cited

U.S. PATENT DOCUMENTS

2007/0076593 A1* 4/2007 Sakurai ............. B60W 50/0205
370/219
2008/0262668 A1* 10/2008 Yamada ................... B60K 6/46
701/22
(Continued)

FOREIGN PATENT DOCUMENTS

JP 2010-132240 A 6/2010
JP 2014-213638 A 11/2014
JP 2020-153903 A 9/2020

OTHER PUBLICATIONS

R. Hegde and K. S. Gurumurthy, "Load Balancing in Multi ECU Configuration," 2009 International Conference on Advances in Recent Technologies in Communication and Computing, 2009, pp. 103-106, doi: 10.1109/ARTCom.2009.55. (Year: 2009).*

*Primary Examiner* — Erin M Piateski
*Assistant Examiner* — Paul Allen

(57) ABSTRACT

A second ECU of the control device generates second vehicle position information based on the look-ahead information and the first vehicle position information sent at a predetermined timing, and generates a traveling plan such that electric traveling is performed in a specific section, based on the second vehicle position information and the look-ahead information. In determination about the entrance and the exit for the specific section based on the second vehicle position information and the look-ahead information, the second ECU provides a margin for at least one of a start point and a finish point of the specific section such that the margin corresponds to the at least one of the entrance and the exit for which the notification by the first notification function is performed.

5 Claims, 5 Drawing Sheets

(51) Int. Cl.
    *B60W 50/14*        (2020.01)
    *G01C 21/34*        (2006.01)

(52) U.S. Cl.
    CPC ... *G01C 21/3461* (2013.01); *B60W 2050/146*
        (2013.01); *B60W 2510/244* (2013.01); *B60W*
               *2520/10* (2013.01)

(58) Field of Classification Search
    USPC .......................................................... 701/22
    See application file for complete search history.

(56) References Cited

U.S. PATENT DOCUMENTS

| | | | |
|---|---|---|---|
| 2011/0191024 A1* | 8/2011 | DeLuca | G01C 21/34 |
| | | | 701/472 |
| 2014/0292078 A1* | 10/2014 | Northall | F16H 61/22 |
| | | | 307/10.1 |
| 2015/0314775 A1* | 11/2015 | Dextreit | B60W 10/08 |
| | | | 180/65.265 |
| 2015/0336568 A1* | 11/2015 | Porras | B60W 20/13 |
| | | | 180/65.265 |
| 2016/0339903 A1* | 11/2016 | Hokoi | B60W 10/08 |
| 2016/0362098 A1* | 12/2016 | Ogawa | B60W 50/0097 |
| 2018/0065499 A1* | 3/2018 | Ogawa | B60K 6/445 |
| 2022/0126814 A1* | 4/2022 | Ogawa | B60W 10/26 |

* cited by examiner

CONTROL DEVICE FOR VEHICLE FOR ELECTRIC TRAVEL SECTION MANAGEMENT

CROSS-REFERENCE TO RELATED APPLICATION

This application claims priority to Japanese Patent Application No. 2023-003893 filed on Jan. 13, 2023, incorporated herein by reference in its entirety.

BACKGROUND

1. Technical Field

The present disclosure relates to a control device for a vehicle.

2. Description of Related Art

Japanese Unexamined Patent Application Publication No. 2014-213638 discloses a technology for controlling a hybrid electric vehicle such that EV traveling (electric traveling) can be performed in an EV traveling section.

SUMMARY

In the hybrid electric vehicle (HEV), a control device for realizing a traveling assistance function to perform the electric traveling in a specific section where the electric traveling is recommended includes first and second electronic control units (first and second ECUs) described below, in some cases. The first ECU generates look-ahead information relevant to a plurality of sections included in a planned traveling route and first vehicle position information, and notifies a user of the entrance and exit for the specific section. The second ECU generates second vehicle position information based on the look-ahead information and the first vehicle position information that are sent from the first ECU at a predetermined timing, and generates a traveling plan based on the second vehicle position information and the look-ahead information, such that the electric traveling is performed in the specific section.

In the control device having the above configuration, a gap can be generated between the first vehicle position information on the first ECU side and the second vehicle position information on the second ECU side. As a result, for the entrance and exit for the specific section, there is a possibility that a time lag is generated between the notification by the first ECU and the switching of a traveling mode by the second ECU and the user of the vehicle has a feeling of strangeness.

The present disclosure has been made in view of the above-described problem, and has an object to provide a control device for a vehicle that makes it possible to restrain the time lag between the switching of the traveling mode and the notification at the times of the entrance and exit for the specific section where the electric traveling is recommended.

A control device for a vehicle according to the present disclosure is applied to a vehicle capable of executing hybrid traveling and electric generation that are performed by cooperation of an internal combustion engine and a single or a plurality of electric motors and electric traveling that is performed by the single or the plurality of electric motors without actuating the internal combustion engine. The control device includes a first electronic control unit and a second electronic control unit. The first electronic control unit generates look-ahead information and first vehicle position information and has a first notification function to notify a user of the vehicle of at least one of entrance and exit for a specific section, based on the look-ahead information and the first vehicle position information, the look-ahead information being relevant to a plurality of sections included in a planned traveling route, the first vehicle position information indicating a current position of the vehicle, the specific section being a section where the electric traveling is recommended. The second electronic control unit generates second vehicle position information based on the look-ahead information and the first vehicle position information that are sent from the first electronic control unit at a predetermined timing, and generates a traveling plan for the vehicle based on the second vehicle position information and the look-ahead information, the second vehicle position information indicating the current position of the vehicle. The traveling plan is generated such that the electric traveling is performed in the specific section. When the second electronic control unit performs determination about the entrance and exit for the specific section based on the second vehicle position information and the look-ahead information, the second electronic control unit provides a margin for at least one of a start point and finish point of the specific section such that the margin corresponds to the at least one of the entrance and the exit for which the notification by the first notification function is performed.

With the present disclosure, it is possible to restrain the time lag between the switching of the traveling mode and the notification at the times of the entrance and exit for the specific section where the electric traveling is recommended.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. Configuration Example of Vehicle

Figure 1:
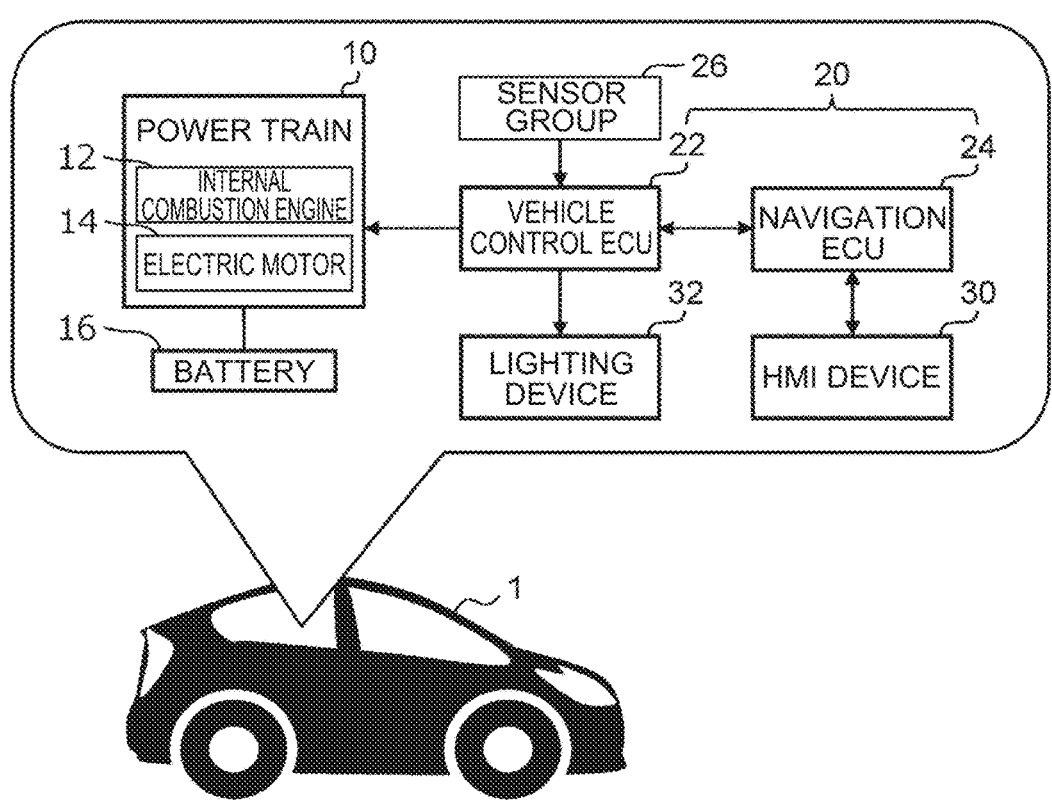
FIG. 1 is a diagram schematically showing the configuration of a vehicle according to an embodiment.

FIG. 1 is a diagram schematically showing the configuration of a vehicle 1 according to an embodiment. The vehicle 1 is a hybrid electric vehicle (HEV), and includes a power train 10, a battery 16, a control device 20, a sensor group 26, a human machine interface (HMI) device 30, and a lighting device 32. The control device 20 includes a vehicle control electronic control unit (ECU) 22 and a navigation ECU 24.

The power train 10 includes an internal combustion engine 12, a single or a plurality of (for example, two) electric motors 14, and the battery 16, and is configured to be capable of executing hybrid traveling (HEV traveling) and electric generation that are performed by cooperation of the internal combustion engine 12 and the electric motor 14 and electric traveling (BEV traveling) that is performed by the electric motor 14 without actuating the internal combustion engine 12. The battery 16 exchanges electric power with the power train 10, more specifically, with the electric motor 14. Specifically, the battery 16 is charged with the electric power generated by the electric motor 14, and is discharged with the electric power consumed by the electric motor 14. The scheme of a hybrid system of the vehicle 1 is not particularly limited, and for example, is a series-parallel scheme, a parallel scheme, or a series scheme. More specifically, the vehicle 1 is a plug-in hybrid electric vehicle (PHEV) in which external charge can be performed, but does not always need to be configured such that the external charge can be performed.

The vehicle control ECU 22 includes a processor and a storage device. The vehicle control ECU 22 takes in a sensor signal from the sensor group 26 attached to the vehicle 1, and outputs an operation signal to the power train 10. In the storage device, various control programs for controlling the power train 10 are stored. The processor reads the control programs from the storage device and executes the control programs, so that various controls relevant to the power train 10 are realized. The sensor group 26 includes various sensors that are used for the control of the power train 10, as exemplified by a vehicle speed sensor and a remaining battery level sensor. The remaining battery level sensor detects the remaining level (remaining battery level) of the battery 16. Hereinafter, the remaining battery level is also referred to as state of charge (SOC).

The navigation ECU 24 includes a processor and a storage device. The navigation ECU 24 is configured to be capable of mutually communicating with an external system through a wireless communication network, and can acquire a variety of data from the external system. As an example, the navigation ECU 24 is included in an in-vehicle multimedia system.

For example, the navigation ECU 24 acquires the current position of the vehicle 1, using a global navigation satellite system (GNSS). Furthermore, the navigation ECU 24 acquires map information from a server in the exterior, for example, and thereby can identify the current position of the vehicle 1 on the map, using a map matching process. Information generated by the navigation ECU 24 and indicating the current position of the vehicle 1 on the map is referred to as vehicle position information I1 (first vehicle position information). The map information herein includes information relevant to a specific area SA where the BEV traveling, that is, the non-actuation of the internal combustion engine 12 is recommended, and geographical information (for example, speed restriction, distance, and road type). For example, the specific area SA is a low emission zone where the traveling of the vehicle 1 with the operation of the internal combustion engine 12 is restricted. The navigation ECU 24 can acquire a variety of traffic information such as congestion information, regulation information, and traffic accident information, from a traffic information center. The navigation ECU 24 can notify the user of the vehicle 1 of the variety of information, using the HMI device 30. For example, the HMI device 30 includes an output unit and an input unit that are provided in a cabin of the vehicle 1. For example, the output unit includes a display of a navigation system, or a meter installed in an instrument panel. The output unit may include a speaker. The input unit is a touch panel or a switch group.

Furthermore, the navigation ECU 24 can accept user's operation through the HMI device 30. For example, when the user inputs a destination by operating the HMI device 30, the navigation ECU 24 creates a planned traveling route PR from the current position of the vehicle 1 to the destination, displays the planned traveling route PR on the HMI device 30, and performs route guidance. Further, for example, the specific area SA may be arbitrarily set by the user that operates the HMI device 30.

Further, the navigation ECU 24 can calculate a required traveling power PW and a section traveling energy E that are needed for traveling in each traveling section (or merely a section) of the planned traveling route PR, based on at least one of traveling data in the past and information included in the map information, as exemplified by the kind or gradient of a road surface. Further, the navigation ECU 24 can calculate a required energy Esum that is needed for traveling over the whole of the planned traveling route PR, by integrating the traveling energy E for each section. In addition, the navigation ECU 24 can calculate a required energy Eev that is needed for traveling over the whole of a later-described "specific section X" by the BEV traveling.

The navigation ECU 24 is connected with the vehicle control ECU 22 such that controller section network (CAN) communication can be performed, for example. Thereby, the vehicle control ECU 22 can acquire a variety of information (section information) relevant to each section of the above-described planned traveling route PR, from the navigation ECU 24. The section information is information that is relevant to each section located forward of the vehicle and that is looked ahead, and is also referred to as "look-ahead information", hereinafter. Further, information for identifying the specific section X is included in the look-ahead information.

The lighting device 32 is disposed in the cabin of the vehicle 1. More specifically, for example, the lighting device 32 is a luminescent device that includes a plurality of LEDs.

The navigation ECU 24 and the vehicle control ECU 22 correspond to examples of the "first electronic control unit" and "second electronic control unit" according to the present disclosure, respectively. Further, each of the navigation ECU 24 and the vehicle control ECU 22 may be configured by combining a plurality of ECUs.

2. Traveling Assistance Function

The control device 20 is configured to be capable of executing a "traveling switching control" described below, as a traveling assistance function of the vehicle 1. Further, the control device 20 has a later-described "notification function F1", as another traveling assistance function.

2-1. Traveling Switching Control

In the traveling switching control, in the case where the "specific section X" exists on the planned traveling route PR to the destination of the vehicle 1, the control device 20 manages the SOC such that a necessary remaining battery level (necessary SOCev) for traveling over the whole of the specific section X by the BEV traveling is secured before the entrance to the specific section X. The specific section X is a section on the planned traveling route PR that is included in the above-described specific area SA. The necessary SOCev is an SOC value that corresponds to the above-described required energy Eev.

More specifically, the vehicle control ECU 22 included in the control device 20 generates a traveling plan for the vehicle 1. The traveling plan is generated based on later-described vehicle position information I2 (second vehicle position information) and the look-ahead information, for the switching between the BEV traveling and the HEV traveling in the traveling switching control. More specifically, for example, the traveling plan is generated such that the required energy Eev for the BEV traveling in the specific section X is secured and the BEV traveling is performed in the specific section X.

For managing the SOC as described above, the control device 20 automatically switches the traveling mode between a charge depleting (CD) mode and a charge sustaining (CS) mode, and thereby automatically selects the BEV traveling or the HEV traveling. The CD mode is a mode for the traveling mainly using the electric power charged in the battery 16. Examples of the CD mode include a mode in which only the BEV traveling is performed until the SOC is depleted and/or a mode in which the switching between the BEV traveling and the HEV traveling is performed such that the SOC is consumed by the BEV traveling as much as possible. In the latter mode, in the case where a high vehicle output is requested by the user, the switching from the BEV traveling to the HEV traveling is executed. On the other hand, in the CS mode, the HEV traveling is performed by actuating the internal combustion engine 12 and the electric motor 14, while the SOC is maintained at a target value by the electric generation using the dynamic power of the internal combustion engine 12. Furthermore, for example, the traveling mode of the vehicle 1 includes a charging mode, in addition to the CD mode and CS mode. The charging mode is a mode in which the HEV traveling is performed for restoring the SOC to a predetermined threshold value when the SOC is depleted.

2-2. Notification Function F1

The notification function F1 described here is a function that is embedded in the in-vehicle multimedia system including the navigation ECU 24, and corresponds to an example of the "first notification function" according to the present disclosure. Specifically, by the notification function F1, the navigation ECU 24 notifies the user of the vehicle 1 of each of the entrance and exit for the specific section X, based on the look-ahead information and the vehicle position information I1. More specifically, a start point Ps and a finish point Pf of the specific section X can be acquired from the look-ahead information. When the navigation ECU 24 determines that the vehicle 1 has reached the start point Ps or the finish point Pf of the specific section X, based on the vehicle position information I1, the navigation ECU 24 executes an entrance or exit notification. That is, the entrance or exit notification is a notification indicating that the vehicle 1 has entered or exited the specific area SA.

The entrance or exit notification by the notification function F1 is performed using the HMI device 30, for example. More specifically, the notification is performed using a display of the HMI device 30, for example. Specific examples of displaying include banner displaying on the display and highlighting and displaying the specific area SA on the map (zone displaying). Further, the notification may be performed using caution displaying on the meter of the instrument panel that is another example of the display. Alternatively, the notification may be performed by voice, using a speaker, for example. The navigation ECU 24 may be configured to perform only one of the entrance notification and the exit notification by the notification function F1.

3. Setting of Margins for Entrance and Exit for Specific Section X

In the control device 20, the vehicle position information I2 that is generated by the vehicle control ECU 22 and that is used for the traveling switching control is different from the vehicle position information I1 that is generated by the navigation ECU 24 and that is used for the notification function F1.

Specifically, as described above, the vehicle position information I1 on the navigation ECU 24 side is generated using the map matching process. On the other hand, the vehicle position information I2 on the vehicle control ECU 22 side is generated based on the look-ahead information and the vehicle position information I1 that are repeatedly sent from the navigation ECU 24 at predetermined timings.

The navigation ECU 24 repeatedly updates the look-ahead information. For example, the update of the look-ahead information is repeatedly executed with a predetermined period (for example, 1 minute). Further, for example, the update is performed also in the case where the vehicle 1 has departed from the current planned traveling route PR by driver's operation. The update timings correspond to examples of the above predetermined timing. In the case where the look-ahead information has been updated, the navigation ECU 24 updates the section number of each section such that a section including the current position of the vehicle 1 at the time of the update becomes a new first section, and sends the updated look-ahead information to the vehicle control ECU 22 together with the updated vehicle position information I1.

At the timing (receiving timing) when the vehicle control ECU 22 receives the look-ahead information updated as described above together with the vehicle position information I1, the vehicle control ECU 22 uses the current position of the vehicle 1 based on the vehicle position information I1, as the current position of the vehicle position information I2 in the vehicle control ECU 22 (update). Then, until the vehicle control ECU 22 receives the look-ahead information and the vehicle position information I1 next time, the vehicle control ECU 22 computes (corrects) the current position, by the following technique, for example. The vehicle control ECU 22 calculates the product of the vehicle speed of the vehicle 1, which is obtained based on the rotation speed of an output shaft of the power train 10, and a sampling period, as the movement distance of the vehicle 1 during one period. Then, whenever the sampling period elapses, the vehicle control ECU 22 updates the current position by the movement distance calculated as described above, from the initial value of the current position based on the vehicle position information I1. In this way, the vehicle position information I2 is generated.

As described above, the vehicle position information I1 and the vehicle position information I2 that are respectively used for the notification function F1 and the traveling switching control are different from each other. Therefore, a gap (position difference) is generated between the vehicle position information I1 and the vehicle position information I2. Specifically, for example, the vehicle position information I2 calculated as described above varies depending on whether the vehicle 1 runs on an inside portion of a lane or on an outside portion of the lane when the vehicle 1 passes through a curve, and varies depending on whether lane change is performed. Therefore, the vehicle position information I2 deviates from the vehicle position information I1 little by little, as time elapses from the above receiving timing.

As a result, for the entrance and exit for the specific section X, there is a possibility that a time lag is generated between the notification by the navigation ECU 24 and the switching of the traveling mode by the vehicle control ECU 22 and the user of the vehicle 1 has a feeling of strangeness. More specifically, due to the time lag, the traveling mode cannot be synchronously switched to the CD mode at the time when the entrance notification is performed by the notification function F1. Alternatively, the traveling mode is switched to the CS mode before the exit notification is performed. This is different from the selection of the CD mode in the specific section X, which is a selection expected by the driver, and therefore can give a feeling of strangeness.

In view of the above-described problem, in the embodiment, when the vehicle control ECU 22 performs determination about the entrance and exit for the specific section X based on the vehicle position information I2 and the look-ahead information, the vehicle control ECU 22 respectively provides margins M1, M2 for the start point Ps and the finish point Pf of the specific section X such that the margins M1, M2 correspond to the entrance and exit for which the notification by the notification function F1 is performed.

Figure 2:
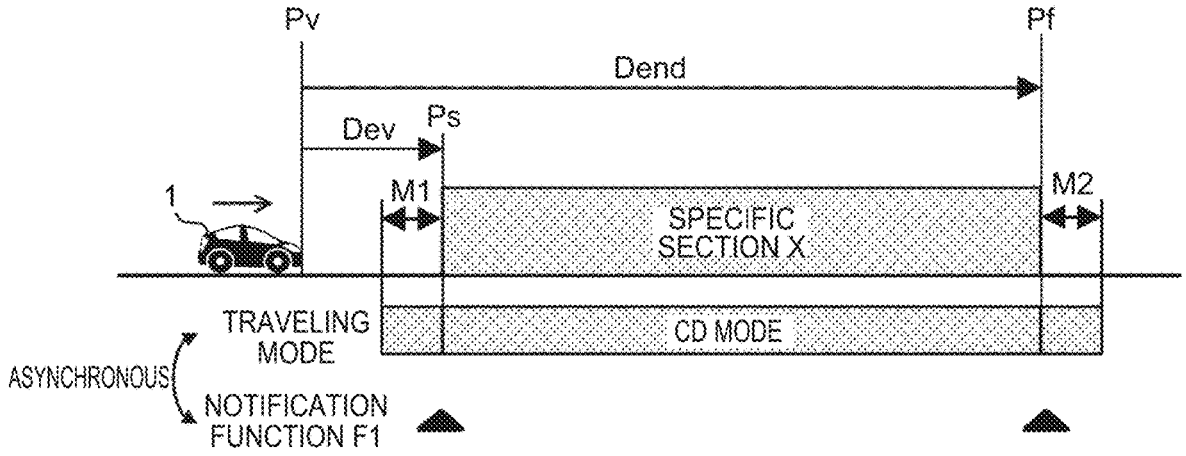
FIG. 2 is a diagram showing a setting example for margins M1, M2 according to the embodiment.

FIG. 2 is a diagram showing a setting example of the margins M1, M2 according to the embodiment. Two triangular marks in FIG. 2 show positions of the vehicle 1 when the notifications of the entrance and the exit by the notification function F1 are performed. Further, the vehicle control ECU 22 acquires information about the start point Ps and the finish point Pf of the specific section X, from specific section information included in the look-ahead information.

As shown in FIG. 2, the margin M1 (for example, 100 m) for the start point Ps of the specific section X is provided so as to extend from the start point Ps to the rearward side in a vehicle moving direction. When a distance (remaining distance) Dev from a current position Pv of the vehicle 1 based on the vehicle position information I2 to the start point Ps becomes equal to or less than the margin M1, the vehicle control ECU 22 determines that the vehicle 1 has entered the specific section X (in other words, the vehicle 1 is regarded as having entered the specific section X). In this way, in the embodiment, the margin M1 is provided such that the determination of the entrance to the specific section X by the vehicle control ECU 22 based on the vehicle position information I2 is not delayed with respect to the actual entrance of the vehicle 1.

Similarly, the margin M2 (for example, 100 m) for the finish point Pf is provided so as to extend from the finish point Pf to the forward side in the vehicle moving direction. A distance (remaining distance) Dend is used for the exit determination that is performed by the vehicle control ECU 22 based on the vehicle position information I2. The distance Dend is the distance from the current position Pv to the finish point Pf Therefore, the distance Dend has a negative value, after the vehicle 1 passes through the finish point Pf. When the distance Dend becomes less than the negative value "−M2" of the margin M2, the vehicle control ECU 22 determines that the vehicle 1 has exited the specific section X (in other words, the vehicle is regarded as having exited the specific section X). In this way, in the embodiment, the margin M2 is provided such that the determination of the exit from the specific section X by the vehicle control ECU 22 based on the vehicle position information I2 is not advanced with respect to the actual exit of the vehicle 1.

Figure 3:
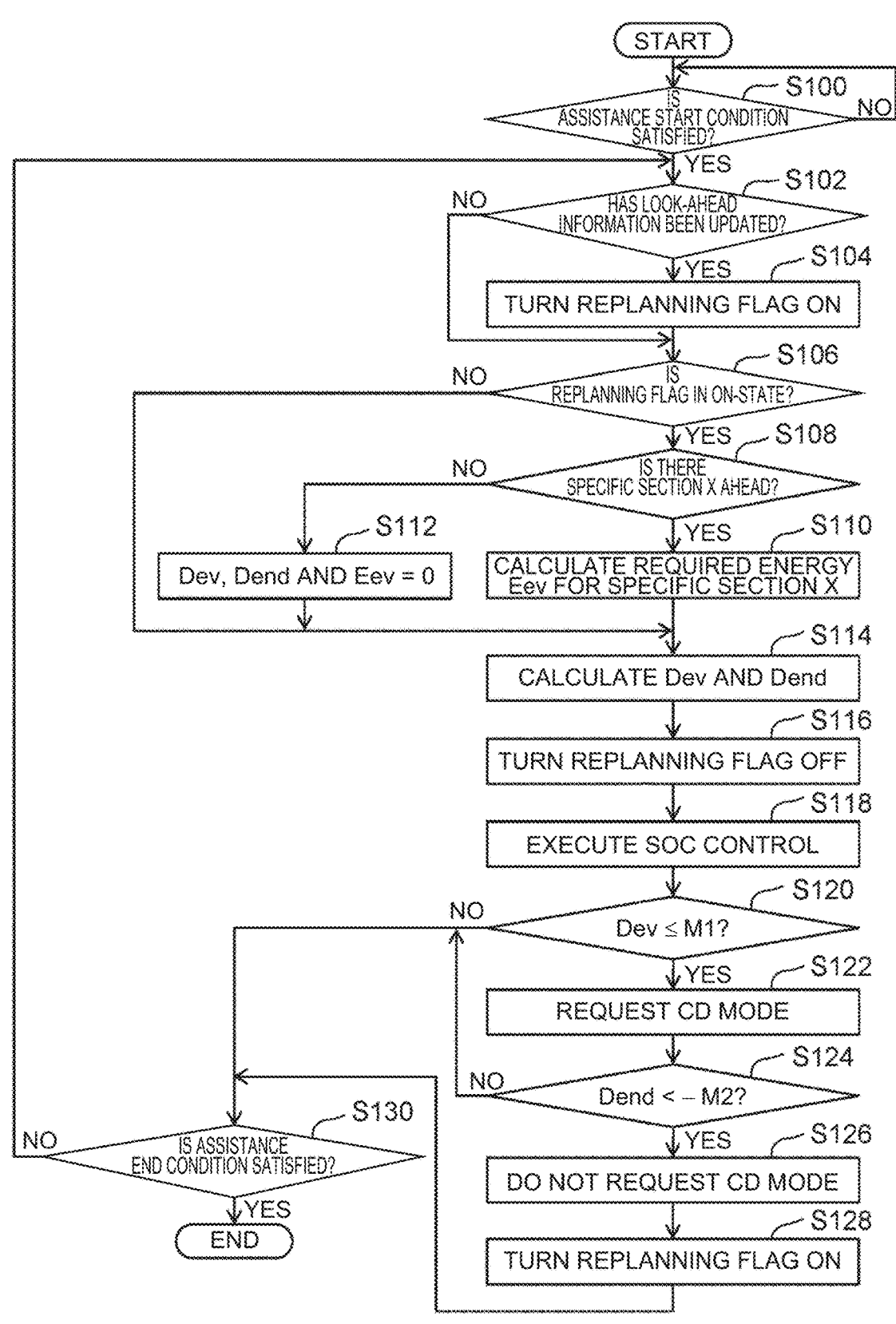
FIG. 3 is a flowchart showing a process relevant to a traveling switching control according to the embodiment.

FIG. 3 is a flowchart showing a process relevant to the traveling switching control according to the embodiment. The process in the flowchart is repeatedly executed by the vehicle control ECU 22.

In step S100, the vehicle control ECU (or merely the ECU) 22 determines whether a start condition for the traveling switching control (in other words, a start condition for traveling assistance) is satisfied. Specifically, for example, the start condition includes a condition that the route guidance based on a request from the user is started, a condition that the vehicle 1 is on the planned traveling route PR, and a condition that the SOC is equal to or higher than a predetermined threshold value. Then, in the case where the determination result is Yes, the process proceeds to step S102.

In step S102, the ECU 22 determines whether the look-ahead information has been updated by the navigation ECU 24. Then, in the case where the look-ahead information has been updated, the ECU 22 turns a replanning flag on in step S104. The replanning flag in the on-state indicates that the update (replanning) of the traveling plan based on the updated look-ahead information is permitted.

In the case where the replanning flag is in the on-state in step S106 following step S104, the process proceeds to step S108. On the other hand, in the case where the replanning flag is in the off-state, the process proceeds to step S114. In step S108, it is determined whether the specific section X exists forward of the vehicle 1, based on the look-ahead information. Then, in the case where the determination result is Yes, the process proceeds to step S110, and on the other hand, in the case where the determination result is No, the process proceeds to step S112.

In step S110, the ECU 22 calculates (estimates) the required energy Eev based on the current look-ahead information. The calculation of the required energy Eev is included in the generation of the traveling plan. In addition, sections corresponding to the margins M1, M2 may be excluded from the target of the calculation of the required energy Eev. In the case where the SOC is so high that the BEV traveling can be executed in the margins M1, M2, the CD mode may be assigned to the margins M1, M2. After step S110, the process proceeds to step S114. On the other hand, in step S112, the ECU 22 resets the distance Dev, the distance Dend, and the required energy Eev, to zero. Thereafter, the process proceeds to step S114.

In step S114, the ECU 22 calculates the distance Dev and the distance Dend based on the look-ahead information (specific section information) and the vehicle position information I2. Next, in step S116, the ECU 22 turns the replanning flag off.

In step S118 following step S116, the ECU 22 controls the SOC by performing the switching between the BEV traveling and the HEV traveling such that the necessary SOCev corresponding to the required energy Eev is secured before the entrance to the specific section X. That is, the management of the SOC is executed. Thereafter, the process proceeds to step S120.

In step S120, the ECU 22 determines whether the vehicle 1 has entered the specific section X, based on whether the distance Dev is equal to or less than the above-described margin M1. The determination result becomes Yes not only at the timing when the vehicle 1 enters the specific section X but also at the time when the vehicle 1 is entering the specific section X. In the case where the determination result is Yes, the process proceeds to step S122, and on the other hand, in the case where the determination result is No, the process proceeds to step S130.

In step S122, the ECU 22 requests the CD mode. As a result, the CD mode is executed with the condition that the SOC is not depleted. Next, in step S124, the ECU 22 determines whether the vehicle 1 has exited the specific section X, based on whether the distance Dend is less than the negative value "−M2" of the above-described margin M2. In the case where the determination result in step S124 is Yes, the process proceeds to step S126, and on the other hand, in the case where the determination result is No, the process proceeds to step S130.

In step S126, the ECU 22 does not request the CD mode. As a result, for example, the CD mode or the CS mode is selected based on the traveling load of a section where the vehicle 1 travels and the current SOC. Next, in step S128, the ECU 22 turns the replanning flag on. This is because the SOC control (SOC management) for the next specific section X can be performed in the case where the next specific section X exists forward of the vehicle 1. Thereafter, the process proceeds to step S130.

In step S130, the ECU 22 determines whether an end condition for the above traveling switching control (in other words, an end condition for traveling assistance) is satisfied. Specifically, for example, the end condition includes a condition that the route guidance is stopped or ended, a condition that the vehicle 1 departs from the planned traveling route PR, a condition that the battery is depleted, or a condition that an abnormality occurs in the vehicle 1. While the end condition is not satisfied as the result of the determination, step S102 and the subsequent steps are repeatedly executed. On the other hand, when the end condition is satisfied, the process shown in FIG. 3 ends.

As described above, with the embodiment, the margins M1, M2 are respectively provided for the start point Ps and the finish point Pf of the specific section X, so as to correspond to the entrance and the exit for which the notification by the notification function F1 is performed. Thereby, at the times of the entrance and exit for the specific section X, it is possible to restrain the time lag between the switching of the traveling mode and the notification. In addition, with the embodiment, for avoiding the user from having a feeling of strangeness due to the time lag, the traveling switching control is executed such that the BEV traveling is executed also before and after the specific section X.

In an example in which the notification by the notification function F1 is performed only for the entrance to the specific section X unlike the example shown in FIG. 2 and FIG. 3, only the margin M1 for the start point Ps may be provided so as to correspond to the entrance notification. Similarly, in an example in which the notification by the notification function F1 is performed only for the exit from the specific section X, only the margin M2 for the finish point Pf may be provided so as to correspond to the exit notification.

4. Setting of Margin Depending on Notification Function

As the notification for informing the user of the entrance or exit for the specific section X, the vehicle 1 sometimes includes not only the notification function F1 but also a "notification function F2" described below. The notification function F2 is executed in collaboration with the above determination (steps S120 and S124) about the entrance and exit for the specific section X that is executed by the vehicle control ECU 22, and corresponds to an example of the "second notification function" according to the present disclosure. That is, the notification by the notification function F2 is executed based on the vehicle position information I2 generated by the vehicle control ECU 22.

The notification function F2 is a notification that is executed as follows using the lighting device 32, for example, and is also referred to as an ambient notification. That is, for example, as an ambient notification, the color of a cabin lighting is changed to a color (for example, green, which suggests ecology) associated with the BEV traveling in the specific section X for a certain time, in response to the determination of the entrance to the specific section X. Further, for example, as an ambient notification, the color of the cabin lighting may be changed from the color associated with the BEV traveling in the specific section X to an ordinary color, in response to the determination of the exit from the specific section X. Alternatively, as the notification function F2, both of the ambient notifications may be performed.

When the above-described notification function F2 is provided, there is a possibility that a time lag between the notification function F2 and the notification function F1 becomes conspicuous due to the existence of the margin M1 and/or the margin M2 provided for restraining the time lag between the notification function F1 and the traveling switching control. This can cause the user to have a feeling of strangeness too much. The reason why this additional problem occurs is because the user more easily perceives the notification by the notification function F2 using the lighting device 32 or the like than the switching of the traveling mode although the traveling switching control and the notification function F2 both use the vehicle position information I2.

Measures against the above-described additional problem will be described in 4-1 and 4-2 described below.

4-1. Example of Margin Depending on Configuration of Notification Functions

An example of the margins M1, M2 depending on the configuration of the notification functions F1, F2 (in other words, the specification of the vehicle 1) will be described.

Figure 4:
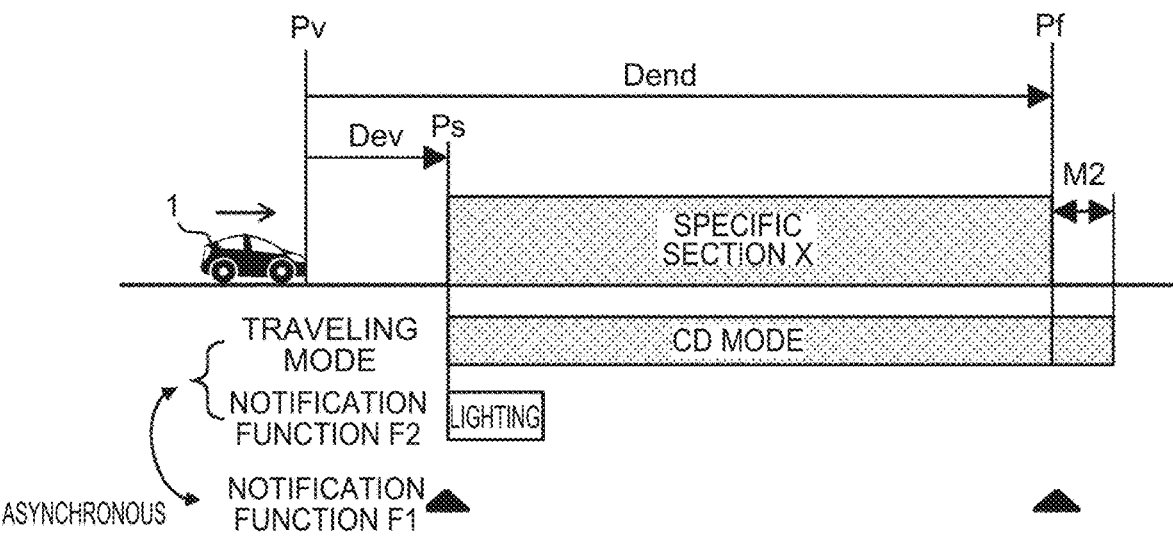
FIG. 4 is a diagram showing a setting example for a margin depending on the configuration of notification functions F1, F2.

FIG. 4 is a diagram showing a setting example for the margin depending on the configuration of the notification functions F1, F2. In the example shown in FIG. 4, only the entrance notification is provided as the notification (ambient notification) by the notification function F2 using the lighting device 32. In this example, the margin M2 corresponding to the exit notification by the notification function F1 is provided, but the margin M1 corresponding to the entrance notification by the notification function F1 is not provided. In other words, in this example, the entrance notifications by both of the notification functions F1, F2, which have an asynchronous relation because the vehicle position information I1 and the vehicle position information I2 that are used are different from each other, are provided. Therefore, the margin M1 on the entrance side is not provided although the entrance notification by the notification function F1 is provided.

In addition, based on the same idea as that in the example shown in FIG. 4, in an example in which only the exit notification by the notification function F2 is provided, it is allowable to employ a configuration in which the margin M2 on the exit side is not provided although the exit notification by the notification function F1 is provided.

Figure 5:
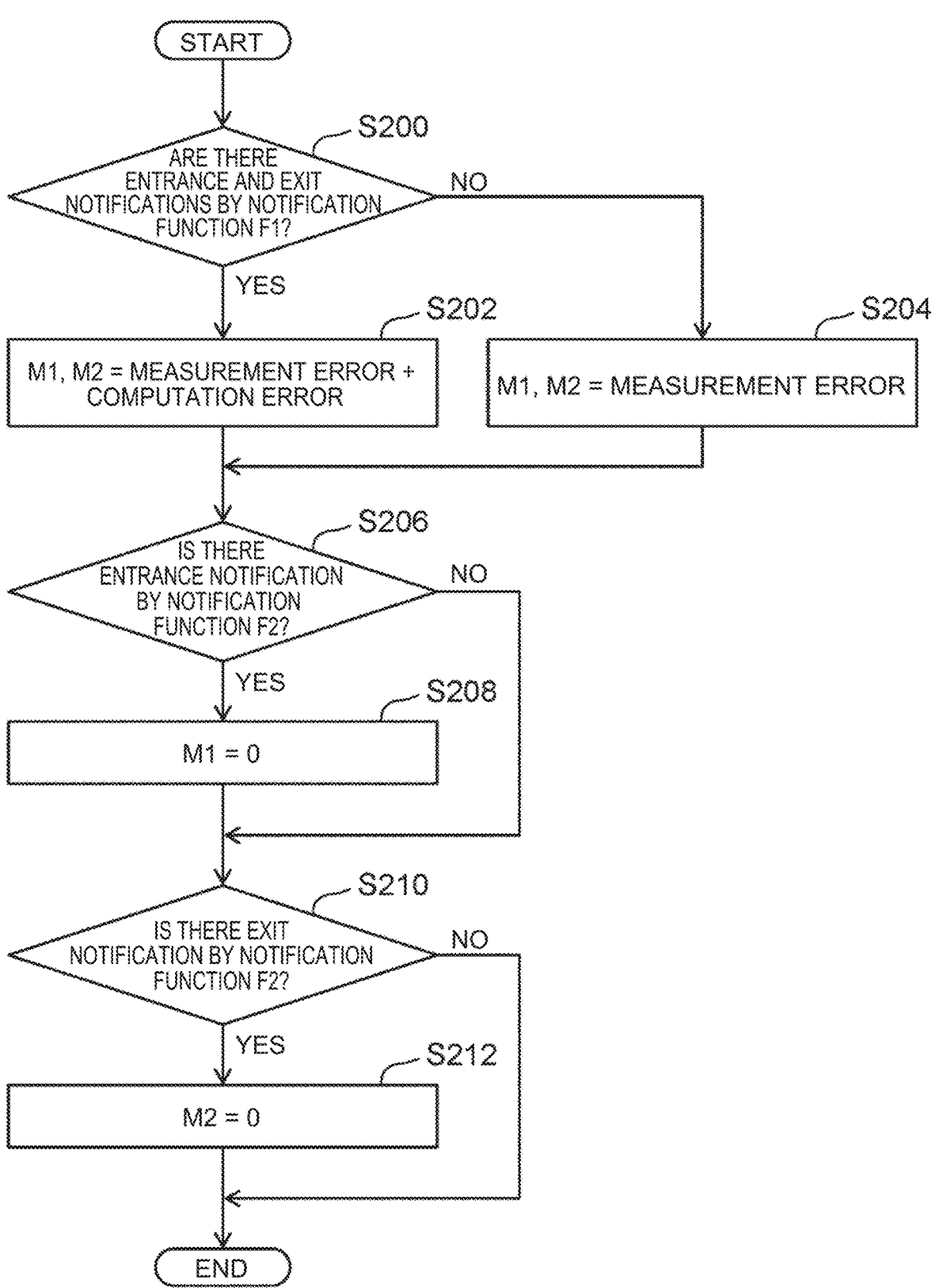
FIG. 5 is a flowchart for describing a decision technique for the margins M1, M2 depending on the configuration of the notification functions F1, F2.

FIG. 5 is a flowchart for describing a decision technique for the margins M1, M2 depending on the configuration of the notification functions F1, F2. The decision of the margins M1, M2 in accordance with the flowchart is executed at the stage of the design (constant design) before the vehicle 1 is manufactured. Then, the decided margins M1, M2 are stored in the storage device of the vehicle control ECU 22.

In FIG. 5, in the case where the vehicle 1 performs the entrance notification and the exit notification by the notification function F1 (step S200; Yes), each of the margins M1, M2 is set so as to be equal to the sum of a measurement error and a computation error (step S202). The measurement error herein is a predetermined value corresponding to the error of the measurement of the vehicle position (vehicle position information I1) by the GNSS and the like. Further, the computation error is a predetermined value corresponding to the error of the computation of the vehicle position as the vehicle position information I2.

On the other hand, in the case where the vehicle 1 performs neither of the entrance notification and the exit notification by the notification function F1 (step S200; No), each of the margins M1, M2 is set so as to be equal to the above measurement error (step S204). Thereby, even in the case where neither of the entrance notification and the exit notification by the notification function F1 is performed, it is possible to restrain the switching to the BEV mode from being delayed with respect to the time point of the actual entrance of the vehicle 1 to the specific section X due to the measurement error of the vehicle position information I1, and it is possible to restrain the switching to the HEV mode from being performed before the time point of the actual exit of the vehicle 1 from the specific section X due to the measurement error of the vehicle position information I1.

In step S206 following step S202 or S204, it is determined whether the vehicle 1 performs the entrance notification by the notification function F2. Then, in the case where the determination result is Yes, the margin M1 on the entrance side is set to zero (step S208). That is, the margin M1 set in step S202 or S204 is updated to zero. Further, instead of this example, in step S208, the margin M1 on the entrance side may be set not to zero but to a smaller value than that in the case where the entrance notification by the notification function F2 is not provided.

In other words, as shown by steps S206 and S208, the setting of the margin M1 based on whether the notification function F2 is provided has higher priority than the setting of the margin M1 based on whether the notification function F1 is performed. The same goes for the margin M2, as shown by subsequent steps S210 and S212.

In the case where the determination result in step S206 is No or after step S208, it is determined whether the vehicle 1 performs the exit notification by the notification function F2, in step S210. Then, in the case where the determination result is Yes, the margin M2 on the exit side is set to zero (step S212). That is, the margin M2 set in step S202 or S204 is updated to zero. Instead of this example, in step S212, the margin M2 on the exit side may be set to a smaller value than that in the case where the exit notification by the notification function F2 is not provided.

By the above-described decision technique for the margins M1, M2 shown in FIG. 5, the existence or non-existence of the margins M1, M2 and the magnitudes of the margins M1, M2 are different depending on whether the vehicle 1 has the notification function F2.

More specifically, by the decision technique for the margins M1, M2 shown in FIG. 5, in the case where the notification by the notification function F2 is executed for only one of the entrance and exit for the specific section X (that is, in the case where only one of steps S206 and S210 is Yes), the margin M1 or M2 for the one of the entrance and exit for the specific section X is set as follows. The margin M1 or M2 for the one of the entrance and exit for the specific section X is set to zero, or is set so as to be smaller than the margin M2 or M1 for the other of the entrance and exit for the specific section X for which the notification by the notification function F2 is not executed.

Thereby, it is possible to restrain the time lag between the notification function F2 and the notification function F1 due to the existence of the margin M1 and/or the margin M2.

4-2. Example of Margin Depending on Actuation States of Notification Functions In view of the above-described additional problem, the margin M1 and/or the margin M2 may be changed depending on actuation states of the notification functions F1, F2 during vehicle traveling. For example, the vehicle 1 may be configured such that the actuations of the notification functions F1, F2 can be switched by an operation by the user that uses the HMI device 30.

Figure 6:
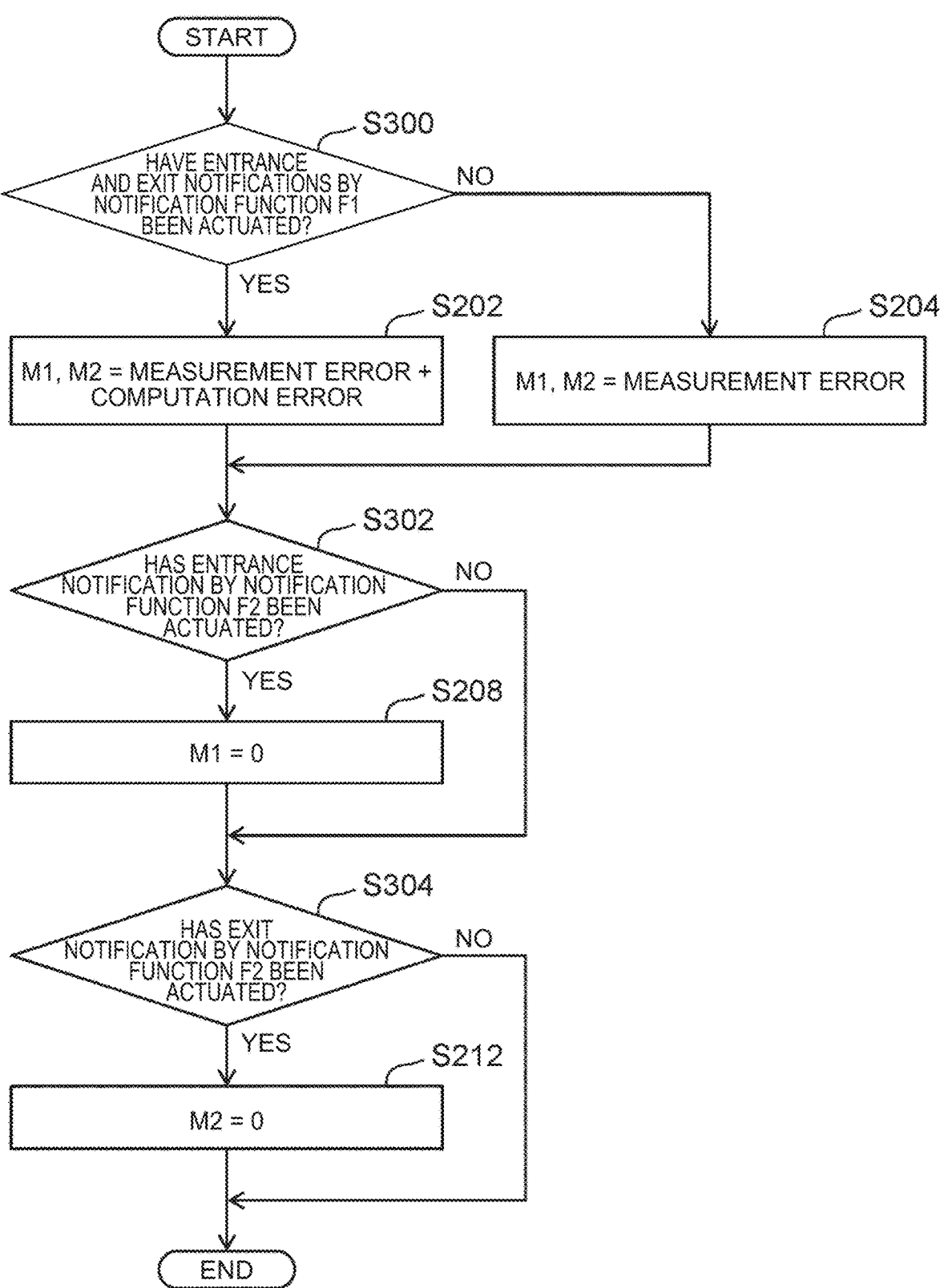
FIG. 6 is a flowchart showing a process relevant to a decision of the margins M1, M2 depending on actuation states of the notification functions F1, F2.

FIG. 6 is a flowchart showing a process relevant to the decision of the margins M1, M2 depending on the actuation states of the notification functions F1, F2. The process in the flowchart is executed by the vehicle control ECU 22, in parallel with the process shown in FIG. 3. Further, in the process shown in FIG. 6, the margins M1, M2 are decided in the same procedure as that in FIG. 5, except that the decision is executed by the vehicle control ECU 22 during the traveling of the vehicle 1. Therefore, the description about FIG. 6 is simplified as described below.

In step S300, the ECU 22 determines whether the entrance notification and the exit notification by the notification function F1 have been actuated. Then, in the case where the determination result is Yes, the process proceeds to step S202, and in the case where the determination result is No, the process proceeds to step S204.

In step S302 following step S202 or S204, the ECU 22 determines whether the entrance notification by the notification function F2 has been actuated. Then, in the case where the determination result is Yes, the process proceeds to steps S208 and S304 in sequence, and in the case where the determination result is No, the process proceeds to step S304.

In step S304, the ECU 22 determines whether the exit notification by the notification function F2 has been actuated. Then, in the case where the determination result is Yes, the process proceeds to step S212, and in the case where the determination result is No, the process proceeds to END.

The above-described process shown in FIG. 6 exerts the same effect as the effect described above for the decision technique for the margins M1, M2 shown in FIG. 5.

What is claimed is:

1. A control device for a vehicle, the vehicle being configured to execute hybrid traveling and electric generation that are performed by cooperation of an internal combustion engine and a single or a plurality of electric motors and electric traveling that is performed by the single or the plurality of electric motors without actuating the internal combustion engine, the control device comprising:

a first electronic control unit including a first processor configured to:

communicate with external systems through a wireless communication network to acquire map information from an external server and position data using a global navigation satellite system, generate first vehicle position information by identifying a current position of the vehicle on a map using a map matching process based on the position data and the map information, generate look-ahead information relevant to a plurality of sections included in a planned traveling route every minute, and provide a first notification function to notify a user of the vehicle of at least one of entrance and exit for a specific section, based on the look-ahead information and the first vehicle position information, the specific section being a section where the electric traveling is recommended; and a second electronic control unit including a second processor configured to:

receive sensor signals including a remaining battery level signal from a sensor group attached to the vehicle and output operation signals to control a power train of the vehicle, calculate second vehicle position information indicating an updated current position of the vehicle based on the first vehicle position information that is sent from the first electronic control unit every minute and a movement distance calculated at sampling periods based on a vehicle speed during each minute interval between updates, generate a traveling plan for the vehicle based on the second vehicle position information and the look-ahead information such that the electric traveling is performed in the specific section, calculate a required energy for the electric traveling in the specific section excluding sections corresponding to margins, assign the electric traveling to the margins when a battery charge is above a threshold, provide a margin for at least one of a start point and a finish point of the specific section when performing determination regarding whether the vehicle has entered or exited the entrance and the exit for the specific section based on the second vehicle position information and the look-ahead information, such that the margin corresponds to the at least one of the entrance and the exit for which the notification by the first notification function is performed, determine the vehicle has entered the specific section when a remaining distance to the start point becomes equal to or less than the margin for the start point, and determine the vehicle has exited the specific section when the vehicle has passed the finish point by more than the margin for the finish point.

2. The control device for the vehicle according to claim 1, wherein a magnitude of the margin, including the magnitude being zero, differs depending on whether the vehicle has a second notification function, the second notification function being a function to notify the user of at least one of the entrance and the exit for the specific section and being executed in collaboration with the determination.

3. The control device for the vehicle according to claim 2, wherein when the notification by the second notification function is executed for only one of the entrance and the exit for the specific section, the margin for the one of the entrance and the exit for the specific section is zero, or is smaller than the margin for the other of the entrance and the exit for the specific section for which the notification by the second notification function is not executed.

4. The control device for the vehicle according to claim 1, wherein:

the vehicle has a second notification function, the second notification function being a function to notify the user of at least one of the entrance and the exit for the specific section and being executed in collaboration with the determination; and the second electronic control unit changes a magnitude of the margin, including the magnitude being zero, depending on whether the second notification function has been actuated.

5. The control device for the vehicle according to claim 4, wherein when the notification by the second notification function is executed for only one of the entrance and the exit for the specific section, the margin for the one of the entrance and the exit for the specific section is zero, or is smaller than the margin for the other of the entrance and the exit for the specific section for which the notification by the second notification function is not executed.

* * * * *